Aug. 15, 1950
C. J. KRACHENFELS
2,519,052
FLAT PRIMARY BATTERY
Filed May 28, 1947
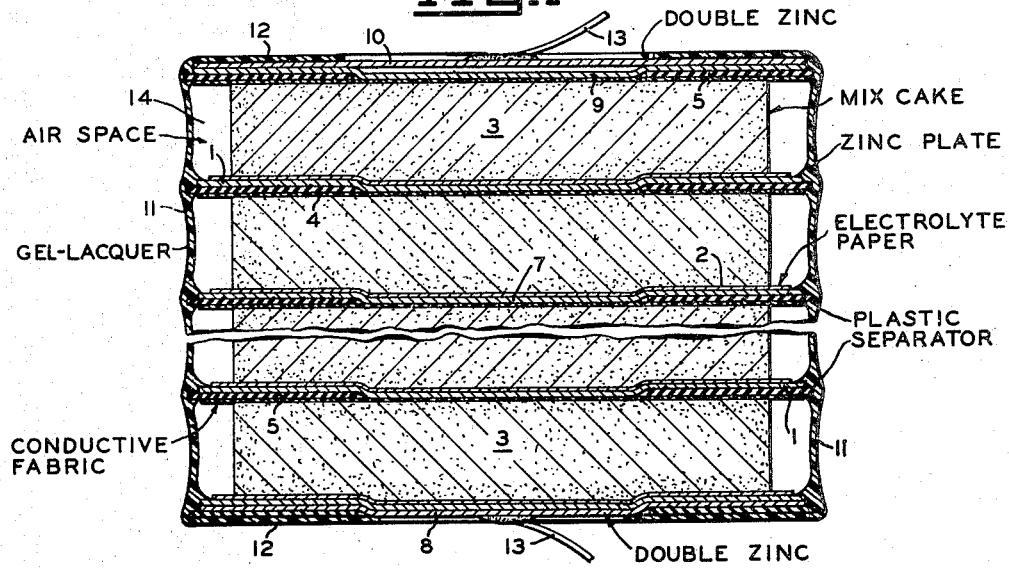
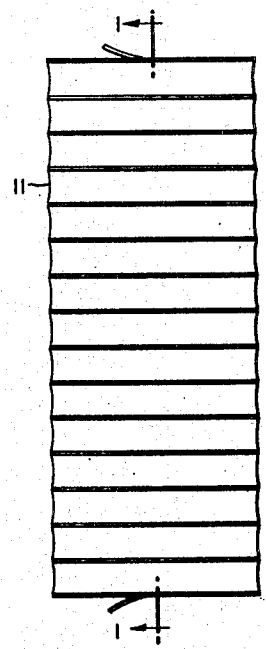
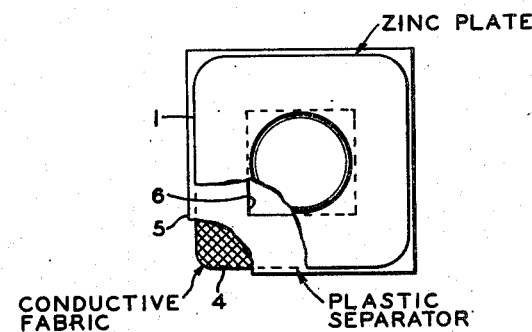
INVENTOR
CARL J. KRACHENFELS
BY
ATTORNEYS Patented Aug. 15, 1950

2,519,052

UNITED STATES PATENT OFFICE 2,519,052

FLAT PRIMARY BATTERY

Carl J. Krachenfels, New Haven, Conn., assignor to Olin Industries, Inc., New Haven, Conn., a corporation of Delaware Application May 28, 1947, Serial No. 750,962

6 Claims. (Cl. 136—111)

This invention relates to primary batteries and more particularly to batteries of the "flat type" consisting of a number of cells formed of flat elements.

In the earlier types of flat battery, the flat elements were arranged in proper order to produce a battery of the desired number of cells and then wrapped with tapes or the like, while under compression, to keep the elements in intimate contact with each other. Instead of wrapping the assembly with tapes, it was sometimes placed in a container and suitable wedges arranged in the space between the ends of the battery and the inside walls of the container to place them under compression. In either instance, the battery after being placed in the container, and while under compression, was surrounded by a suitable plastic material which was poured into the container, while in liquid or semi-liquid form, to fill the voids and then solidify, to retain the electrolyte in place.

Another type of flat battery consists of separate groups of flat elements, which may or may not form complete cells, but in which the peripheral margin of certain groups of elements, are covered with an integument to insulate the electrolyte in the respective cells, and the entire battery held in compression by binding tapes or the walls of the container in which it is confined. In these constructions the groups of elements are incapable of maintaining the desired pressure for purposes of electric contact without additional means, such as the aforesaid tapes or container wall.

It has also been proposed to construct a battery in which groups of flat elements are arranged in tray-like containers having open tops and partially open bottoms to permit contact between the adjacent elements. The depth of these trays is greater than that of the group of elements contained therein so that the side walls of the trays overlap when a number of them are nested to form a battery. In the constructions heretofore proposed, the side walls of the trays have either been tapered or stepped to permit nesting of the containers when assembled to form a battery.

In the present invention I provide a battery consisting of a plurality of cells formed of flat elements in which the cells are effectively separated from each other and in which substantially all of the space within the battery is occupied by active elements. In many uses to which such batteries are put, the space provided for the reception of the battery is limited and, at the same time, the battery must be of a certain capacity to serve the purpose for which it is intended. Thus, a construction which eliminates outer casings, surrounding layers of plastic material, trays to receive the cell elements, etc. is a distinct advantage over flat batteries as heretofore constructed.

In carrying out the present invention, I assemble a plurality of cells of flat elements with the cathode of each cell in contact with the anode of the adjacent cell and with the cells otherwise separated from each other by flat, nonconductive partitions, preferably formed of sheets of plastic material. The assembly is then placed under compression, and while under compression, it is dipped into a solution of a gel lacquer. When the dipped battery is removed from the solution, the lacquer gels, and upon evaporation of the solvent, it produces a smooth, shrink-fit jacket or casing surrounding the battery. The shrinkage retains the cell elements under compression and thereby produces a battery having good electrical characteristics.

In the accompanying drawing I have shown one embodiment of the invention. In this showing:

Fig. 1 is a vertical, sectional view of a battery on line 1—1 of Fig. 2;

Fig. 2 is an elevational view; and

Fig. 3 is a detailed, plan view of an assembly of a cathode, plastic partition and anode with parts being broken away to illustrate the construction.

Referring to the drawing the battery consists of a plurality of cells each of which includes a substantially flat zinc anode 1, an electrolyte saturated absorbent paper 2, a mix cake 3 of depolarizing material, and a cathode member 4.

Partitions 5 of plastic material are arranged between adjacent groups of cell elements. As shown, these partitions are provided with central openings 6 and the anode 1 is embossed in the center as at 7 so that when assembled, the embossed portion extends through the opening 6 and is flush with the opposite side.

The separator 2 is of any absorbent paper commonly used in battery constructions preferably provided with a coating of paste on the side adjacent the anode and carries the usual electrolyte. The mix cake 3 consists of a pressed cake of the usual depolarizing mix employed in dry cells. It may thus consist of a mixture of powdered carbon and manganese dioxide with a suitable binder to retain the components in a cake form.

The cathode 4 may consist of a strip of cloth or other flexible material impregnated with a carbon paint which forms the cathode. This composition may consist of an elastomer mixed with a conductive paint, such as graphite or acetylene black, or a mixture of the two. It is first dispersed in a suitable solvent, such as a mixture of methyl ethyl ketone and toluene, to a consistency which will readily spread and penetrate the interstices of the fabric. The elastomer may be vinyl chloride-acetate copolymer or polyvinyl butyral compositions of the thermoplastic or thermosetting variety or copolymers of vinylidene chloride with vinyl chloride.

The surface of the anode in engagement with the plastic partition and the surface of the cathode in engagement with the plastic partition are coated with a conductive cement which consists of a mixture of a conductive pigment, such as graphite or acetylene black or a mixture of the two dispersed in any suitable solvent, such as a ketone or an ester or mixture thereof containing a thermoplastic cement admixed therewith. The cement may be any of the electrically conductive rubber compositions formed of natural rubber or synthetic elastomers. The anode and cathode are sealed to the plastic partition by this cement and to each other, thus electrically connecting the anode of one cell to the cathode of the adjacent cell. In constructing a battery, these three elements are heat sealed together in groups as illustrated in Fig. 3 of the drawing. They are then assembled with the paper liners and mix cakes and a number of cells to produce a battery of the desired size are stacked. A second zinc plate 8 is placed on the bottom of the stack and two zinc plates 9 and 10, one of which may be embossed and one of which may be flat as shown, are placed over the cathode of the upper cell. The stacked cells, clamped in a device which will maintain them under compression, are then dipped into a gel lacquer. They are dipped with the axis of the battery, perpendicular to the cell elements, arranged horizontally. While in the lacquer, partially submerged, the battery is rotated and a jacket consisting of side walls 11 and top and bottom portions 12 is formed on the battery. The rotation is continued after the coated stack is removed from the solution and continued until the lacquer gels. This produces a uniform coating. By partially immersing the battery in the lacquer, a portion of the top and bottom are left uncoated and suitable leads 13 may be soldered or otherwise secured to the uncoated portions of the zinc plates 8 and 10.

The partitions are preferably formed of sheets of cellulose acetate butyrate sheet stock which is readily wetted by the gel lacquer. The gel lacquer consists of plasticized cellulose acetate butyrate dissolved in a mixture of an aromatic hydrocarbon and an aliphatic alcohol of 3 to 5 carbon atoms. I have successfully employed a 20 percent solution of cellulose acetate butyrate molding powder, medium hard grade, dissolved in a mixture of 16 percent isopropanol and 84 percent xylene. The lacquer solution in which the cells are dipped is maintained sufficiently fluid by keeping it at a temperature from 115 to 120° C. The lacquer, however, gels at room temperature and when the battery is removed from the solution and brought to room temperature, the lacquer gels sufficiently firm that it does not flow. Upon evaporation of the solvent a casing or jacket 11—12 of a thickness of about .010" to .015" is formed. As the lacquer also shrinks upon gelling and drying, the jacket forms a shrink-fit and maintains the battery under compression, thus assuring continued good electrical characteristics.

A further advantage is the fact that while a gel lacquer readily wets the plastic partitions 5 and therefore prevents intercell leakage of the electrolyte, it does not wet the depolarizing mixture. Thus on drying, an air space 14 is provided surrounding the mix cake of each cell.

The advantages of such construction over flat batteries fabricated from preformed cell containers will be obvious to those skilled in the art. On test a battery of this construction has shown greater capacity than other constructions of the same size. In the drawing I have illustrated a battery formed of separate anodes and cathodes but it will be apparent that the invention may be readily applied to a flat cell formed with the so-called duplex electrodes, such as is disclosed in the Ryder and Huntley Patent 1,508,987. In such construction one face of the electrode is sealed to the plastic separator. Other modifications in the details of construction will be apparent to those skilled in the art.

The disclosure and claims of the present application are directed to a flat battery in which the groups of cell elements are separated from each other by a rigid partition of plastic material and in which the battery is surrounded by a jacket formed of a single layer of a non-conductive thermoplastic material which is bonded to the edges of the partitions.

In the copending application of Otto K. Reinhardt, Serial No. 751,041, filed May 28, 1947, there is disclosed a similar type of battery in which the partition members are formed in a unitary strip with a connecting portion between each two partition members of a length equal to the height of a group of cell elements.

In the William B. Woodring application, Serial No. 750,955, filed May 28, 1947, there is also disclosed a similar type of battery in which the partition members are conductive and serve as combined partitions and cathodes.

I claim:

1. A flat battery comprising an assembly of substantially flat cell elements arranged in proper order to form a plurality of cells and including mix cakes, a flat partition member of sheet insulating material at the top and bottom of each cell and having its edges extending beyond the edges of the mix cake, and a shrink-fit jacket of a single layer of thermoplastic material, capable of forming a gel lacquer, extending over the top and bottom edges of the battery and retaining the cell elements under compression, said jacket being bonded to the edges of the said partition members, and spaced from the edges of the mix cakes, thereby sealing the cells from one another and furnishing an air space surrounding each mix cake.

2. A flat battery comprising an assembly of substantially flat cell elements arranged in proper order to form a plurality of cells and including mix cakes, a flat partition member of sheet insulating material at the top and bottom of each cell and having its edges extending beyond the edges of the mix cake, and a shrink-fit jacket of a layer of cellulose acetate butyrate, the jacket extending over the edges of the top and bottom of the battery to retain the cell elements under compression, being bonded to the edges of the said partition members and spaced from the edges of the mix cakes, thereby sealing each cell from the others and furnishing an air space surrounding each mix cake.

3. A flat battery comprising an assembly of substantially flat cell elements arranged in proper order to form a plurality of cells and including mix cakes, a flat partition member of sheet insulating material at the top and bottom of each cell and having its edges extending beyond the edges of the mix cakes, the said members being provided with openings through which one of the two adjacent electrodes projects to contact with the electrode of the next cell, and a shrink-fit jacket of a single layer of a non-conductive thermoplastic material, the jacket extending over the edges of the top and bottom of the battery to retain the cell elements under compression, being bonded to the edges of the partition members and spaced from the edges of the mix cakes, thereby sealing each cell from the others and furnishing an air space surrounding each mix cake.

4. A flat battery comprising an assembly of substantially flat cell elements arranged in proper order to form a plurality of cells and including metal plates forming the anodes of the cells, carbon containing cathodes and mix cakes, a flat partition member of sheet insulating material arranged between the anode of one cell and the cathode of the adjacent cell, said partition members being provided with openings, the metal anodes being embossed to extend through the openings into contact with the cathodes of the adjacent cells, the partition members being of greater area than the mix cakes and extending beyond the edges of the mix cakes, and a shrink-fit jacket of a single layer of a non-conductive thermoplastic material, the jacket extending over the edges of the top and bottom of the battery to retain the cell elements under compression, being bonded to the edges of the partition members and spaced from the edges of the mix cakes thereby sealing each cell from the others and furnisihng an air space surrounding each mix cake.

5. A flat battery comprising an assemby of substantially flat cell elements arranged in proper order to form a plurality of cells and including zinc plates forming the anodes of the cells, carbon containing cathodes and mixe cakes, a flat partition member of sheet insulating material arranged between the anode of one cell and the cathode of the adjacent cell, said partition members being provided with openings, the zinc plates being embossed to extend through the openings into contact with the cathodes of the adjacent cells, the electrodes being cemented to the partition members and to each other by a conductive cement, the members being of greater area than the mix cakes and extending beyond the edges of the mix cakes, and a shrink-fit jacket of a single layer of a non-conductive thermoplastic material, the jacket extending over the edges of the top and bottom of the battery to retain the cell elements under compression, being bonded to the edges of the partition members and spaced from the edges of the mix cakes thereby sealing each cell from the others and furnishing an air space surrounding each mix cake.

6. A flat battery comprising an assembly of substantially flat cell elements arranged in proper order to form a plurality of cells and including mix cakes, a flat partition member of cellulose acetate butyrate at the top and bottom of each cell and having its edges extending beyond the edges of the mix cake, and a shrink-fit jacket of a single layer of thermoplastic material, capable of forming a gel lacquer, extending over the top and bottom edges of the battery and retaining the cell elements under compression, said jacket being bonded to the edges of the said partition members and spaced from the edges of the mix cakes, thereby sealing the cells from one another and furnishing an air space surrounding each mix cake.

CARL J. KRACHENFELS.

REFERENCES CITED

The following references are of record in the file of this patent:

UNITED STATES PATENTS

| Number | Name | Date |
|---|---|---|
| 1,821,008 | Dittrick et al. | Sept. 1, 1931 |
| 1,916,709 | Zimmerman | July 4, 1933 |
| 2,154,312 | MacCallum | Apr. 11, 1939 |
| 2,272,969 | French | Feb. 10, 1942 |
| 2,416,576 | Franz et al. | Feb. 25, 1947 |

FOREIGN PATENTS

| Number | Country | Date |
|---|---|---|
| 269,977 | Great Britain | Apr. 27, 1927 |

OTHER REFERENCES

Hamer et al., Trans. Electrochemical Society, volume 90 (1946) pages 449, 465.